Patented May 10, 1938

2,117,210

UNITED STATES PATENT OFFICE 2,117,210

MANUFACTURE OF SHAPED ARTICLES OF POLYMERIC ACRYLIC ACID NITRILE

Herbert Rein, Leipzig, Germany, assignor to I. G. Farbenindustrie Aktiengesellschaft, Frankfort-on-the-Main, Germany No Drawing. Application August 19, 1935, Serial No. 36,937. In Germany August 21, 1934

6 Claims. (Cl. 106—22)

My present invention relates to the manufacture of shaped articles of acrylic acid nitrile.

One of its objects is a process of manufacturing shaped articles of acrylic acid nitrile. Further objects will be seen from the detailed specification following hereafter.

I have found that by treating polymeric acrylic acid nitrile with a quaternary ammonium compound in the warmth, preferably a pyridinium compound, a solution is obtained which is suitable for making shaped bodies, films, threads or the like. The treatment is preferably carried out at a temperature of 90 to 110° C., however, the invention is not limited thereto, the application of higher or lower temperatures being possible. The polyacrylic acid nitrile dissolves particularly smoothly if instead of the finished ammonium base, the compound is allowed to form from an alkyl- or aryl-halide and an amine in the presence of the nitrile. It is not necessary that the halogen compound and the amine should be used in molecular proportions; there may be used an excess of amine. If desired, a suitable solvent or diluent may be added to the solution, for instance, there may be used an excess of pyridine or there may be added another basic compound. The polyacrylic acid nitrile may be precipitated from the solution by a process in itself known, namely by adding water, an acid, a salt solution or the like. If desired there may be added to the solution of the polymeric acrylic acid nitrile a polypeptide, for instance casein, or there may be added cellulose, preferably cellulose hydrate.

The following examples illustrate the invention:

*Example 1.*—30 grams of finely powdered polyacrylic-acid nitrile are added to a mixture of 1050 grams of benzyl chloride and 800 grams of pyridine and the whole is heated while stirring, at about 115° C. During the reaction between the benzylchloride and the pyridine to produce benzyl-pyridiniumchloride the polyacrylic acid nitrile passes spontaneously into solution. The latter is red-brown and viscous and coagulates on cooling.

*Example 2.*—1200 grams of pyridine and 700 grams of benzyl-chloride are heated together and, while stirring, 30 grams each of casein, comminuted hydrated cellulose and polyacrylic acidnitrile are introduced. The temperature is kept at 95–115° C. After a short time all the solid constituents pass into solution while swelling strongly and there is produced a yellow-brown, somewhat turbid, viscous solution.

*Example 3.*—3 grams of comminuted hydrated cellulose, 3 grams of casein and 3 grams of polyacrylic acid-nitrile are introduced, while stirring, into a mixture of 100 grams of pyridine and 80 grams of chloracetic acid ethylester. The mixture is heated until the hexothermic reaction between the halogen compound and the amine begins. The temperature is then kept at 100–115° C., whereby a highly viscous brown-red solution is gradually obtained.

What I claim is:

1. A process of producing shaped articles of polymeric acrylic acid nitrile which comprises treating polymeric acrylic acid nitrile with a pyridinium compound in the warmth until dissolution occurs, and forming the article from said solution.

2. A process of producing shaped articles of polymeric acrylic acid nitrile which comprises treating polymeric acrylic acid nitrile with a pyridinium compound at a temperature between 90 and 110° C. until dissolution occurs, and forming the article from said solution.

3. A process of producing shaped articles of polymeric acrylic acid nitrile which comprises treating polymeric acrylic acid nitrile with a quaternary ammonium compound in the warmth until dissolution occurs, adding to said solution a polypetide, and forming the article from said solution.

4. A process of producing shaped articles of polymeric acrylic acid nitrile which comprises heating pyridine and benzylchloride together, adding while stirring casein, comminuted hydrated cellulose and polymeric acrylic acid nitrile, keeping the temperature at 95 to 115° C. until dissolution of the compounds occurs, and forming the article from said solution.

5. A process of producing shaped articles of polymeric acrylic acid nitrile which comprises adding polymeric acrylic acid nitrile to a mixture of benzylchloride and pyridine, heating the mixture at about 115° C. until dissolution occurs, and forming the article from said solution.

6. A process of producing shaped articles of polymeric acrylic acid nitrile which comprises adding to a mixture of pyridine and chloracetic acid ethylester comminuted cellulose hydrate, casein and polymeric acrylic acid nitrile, heating the mixture at 100 to 115° C., and forming the article from said mass.

HERBERT REIN.